Dec. 26, 1939.    D. A. MEEKER ET AL    2,185,156
FOOD HANDLING APPARATUS
Original Filed Nov. 2, 1937    2 Sheets-Sheet 1

INVENTORS
David A. Meeker and
Russell C. Geiger
Marechal & Noe
ATTORNEYS

Dec. 26, 1939.   D. A. MEEKER ET AL   2,185,156
FOOD HANDLING APPARATUS
Original Filed Nov. 2, 1937   2 Sheets-Sheet 2

INVENTORS
David A. Meeker and
Russell C. Geiger

Maréchal & Noe
ATTORNEYS

Patented Dec. 26, 1939

2,185,156

UNITED STATES PATENT OFFICE 2,185,156

FOOD HANDLING APPARATUS

David A. Meeker and Russell C. Geiger, Troy, Ohio, assignors to The Hobart Manufacturing Company, Troy, Ohio, a corporation of Ohio Original application June 6, 1939, Serial No. 277,670, which is a division of application Serial No. 172,396, November 2, 1937. Divided and this application September 26, 1939, Serial No. 296,668

6 Claims. (Cl. 248—361)

This invention relates to food handling apparatus.

It is the principal object of the invention to provide a small, compact, lightweight, readily portable food handling device having a wide range of speed and power and adapted for the preparation of various foodstuffs in the domestic kitchen.

It is a further object to provide a device of this character which is easy to operate and in which a mixing bowl is held in operative position on a base by a simple rotating movement and in which the power drive means carrying the rotating beater is mounted for pivotal movement into and out of the bowl.

It is a further object to provide in a food handling device a pivotally mounted drive means which operates a beater with a planetary motion in a bowl, the bowl being fastened in operative position by a simple rotating movement, and in which the beater element in any position thereof may be directly placed in and withdrawn from the bowl upon pivotal movement of the drive means.

It is a further object to provide simple and effective means for fastening the bowl to the supporting base of the device.

It is a still further object to provide a power drive means conveniently enclosed in a casing making for easy assembly and repair and having a decorative and attractive outer appearance.

Other objects and advantages will be apparent from the following description, the accompanying drawings, and the appended claims.

In the drawings—

Figure 1:
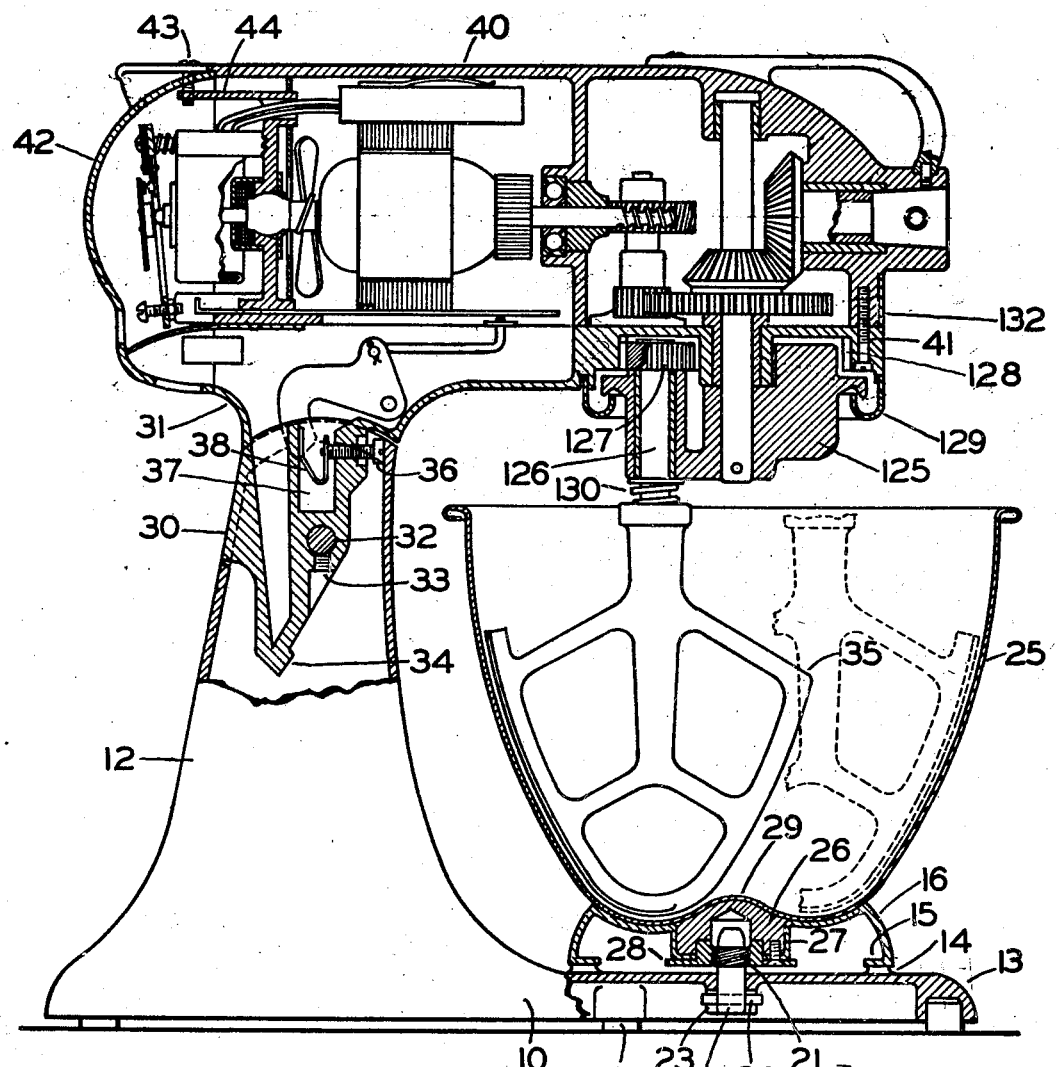
Fig. 1 is a view partially in section and partly in elevation showing a food handling device constructed in accordance with the present invention.
Figure 2:
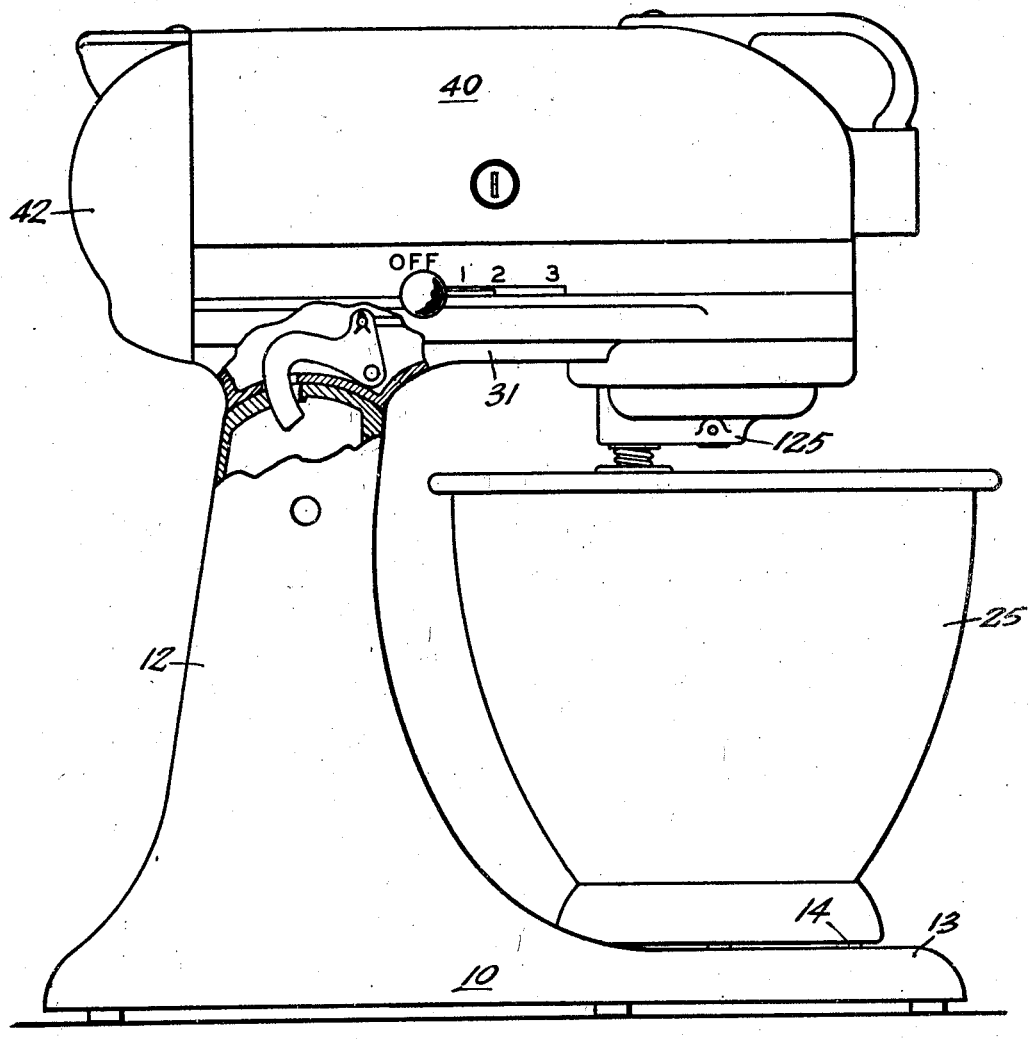
Fig. 2 is a view in side elevation showing the assembled device and with a portion thereof broken away.
Figure 3:
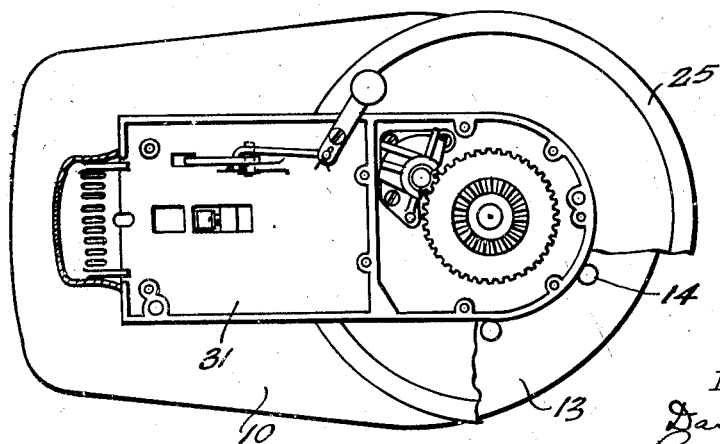
Fig. 3 is a plan view looking down upon the lower part of the casing with the top part removed, a portion of the bowl being broken away to show the base construction.

This application is filed as a division of copending application Serial No. 277,670 filed June 6, 1939 which in turn is a division of copending application Serial No. 172,396 filed November 2, 1937, all of said applications being assigned to the same assignee as this application.

Referring now to the drawings which disclose a preferred embodiment of the invention, there is shown at 10 a base structure within which are fixed a number of rubber or other resilient pads 11 adapted to firmly support the device slightly above a supporting surface, and to hold it firmly in place during operation. A pedestal 12 formed integrally with the base extends upwardly at one side thereof. At the opposite side a platform 13 is provided for the reception of the mixing bowl. This platform is formed with a plane top surface, with a number of upwardly extending bosses 14 positioned thereon. As shown, six such bosses are provided, being located around the periphery of a circle such that they lie directly beneath the base portion 15 of the bowl flange 16, the inturned portion 15 providing for the seating of the bowl upon the several bosses. Being machined to a uniform height, a level and firm support for the bowl is thus provided.

Located centrally of the platform is a locking screw 20 formed with a tapered upstanding end and having a threaded shoulder portion 21 of enlarged diameter. The shank of the screw extends downwardly through an aperture in the platform 13 and at its lower portion is provided with a cross pin 22 which extends between downwardly projecting flanges 23, formed integrally with the base member. This structure is such that the threaded screw portion 21 cannot drop through the aperture, but may be drawn upwardly a limited distance while rotation thereof is prevented by means of the pin and flange construction.

The bowl proper is shown at 25 and is preferably formed as an integral spun metal unit, entirely free of projections or attaching means on its side wall or top. Thus it is symmetrical when viewed from any angle, and does not require positioning upon the device in any predetermined angular position. The lower flange 16 is welded to the base of the bowl and is formed to receive a central apertured member 26 to which is fastened, by means of screws 27, a threaded socket 28 adapted to receive the threaded portion 21 of the locking screw 20. A raised portion 29 is formed upon the interior of the bowl at the bottom so that even a small quantity of material may be properly treated.

In the operation of placing the bowl upon the base, the bowl is first placed over the screw 20 so that the threaded end is received within member 28, the flange 15 in this position resting upon the several bosses 14. In the initial positioning of the bowl, screw 20 occupies its lowermost position, and thus does not lift the bowl materially above the supporting bosses, the bowl occupying a position only slightly raised above its final operative position. The bowl is then given a rotating movement, causing the threads of member 28 to engage the threaded portion of the locking screw, thereby upon continued rotation drawing the locking screw upwardly. After engagement of the threads, and rotation to a sufficient extent to provide proper holding action, the locking screw is pulled up against cross pin 22, and the bowl thereby firmly locked in definite and predetermined position. Being supported around the periphery of the base on the several bosses, and being firmly locked centrally, the bowl is definitely locked in proper and desired operating position. In practice it has been found that a turn of less than half a revolution is adequate to provide for the proper threading and locking engagement of the bowl upon the locking screw. And by reason of the fact that the locking screw occupies its lowermost position at the time the bowl is placed thereon, it is not possible for the bowl to be tilted materially away from the horizontal position, and therefore assurance is provided that the screw threaded part will not be jammed in fastening the bowl in position, and that proper engagement of the threaded parts will consistently take place.

The pedestal 12 provides for pivotally supporting the power drive unit which extends in overhanging relation with respect to the base and the bowl positioned thereon. For this purpose the top of the pedestal is curved in an arcuate manner as shown and is provided with a centrally arranged aperture for the reception of the tongue 30 formed integrally with the lower casing member 31 of the power unit. Tongue 30 receives the pivot pin 32 which extends on either side thereof into the wall of the pedestal 12 for rotation therein. Set screw 33 provides for locking the pin 32 in the tongue so that the pin will be caused to rotate at the spaced supports in the side wall of the pedestal.

A projection 34 is provided adjacent the lower end of the tongue and is adapted to abut the inner wall of the pedestal when the assembly is rotated to lift the beater element 35 from the bowl, this projection serving as a limit means for determining the uppermost position. This position is such that the center of gravity lies to the left of the pivot axis as shown in Fig. 1 so that the device will remain in that position under gravity.

Means are also provided for limiting the lowermost position of the device, to secure accurate location of the beater with respect to the bottom of the bowl. This means comprises a screw 36 threadedly mounted in a portion of the tongue 30 above the pivot axis 32. The end of the screw 36 extends into a recess 37 in the tongue within which is located a spring tension member 38 which serves to yieldably retain the screw in any predetermined position of adjustment. The head of the screw is adapted to abut against the upper portion of the side wall of the pedestal, as shown in Fig. 1, to determine and limit a downward movement of the power device. Adjustment of the screw is effected in the raised position of the device at which time access may be secured to the screw through the aperture in the pedestal which receives tongue 30.

It is important in a device of this character adapted for performing a range of beating and mixing operations that the beater closely approach both the side walls and the bottom of the bowl. This is important not only in the treating of a small quantity of material, but also in the treating of lumpy materials, such as in the creaming of butter, the mashing of potatoes and the like. Where the beater does not closely approach the wall, the materials are improperly and incompletely beaten or treated, and it is not possible to secure complete and uniform treatment of the entire mass of the material. If the operation is merely continued for an extended period of time in order to secure some treatment of all portions of the material, it is usually found that excessive beating of the more readily treated parts has taken place. Accordingly the present device is so constructed and arranged that by means of setting the screw 36, the beater 35 may be caused to closely approach the bottom of the bowl, the beater preferably being shaped to conform to the shape of the bowl, so that there will be substantially no untreated material in the bottom of the bowl, and so that in each cycle of its planetary movement the beater will closely approach the wall of the bowl over its entire extent.

The power unit which provides for the driving of the beater element is formed of two separable casing parts. The lower part 31 as already described is formed integrally with the supporting tongue 30, and the upper part 40 is preferably formed as an integral unit separable from the lower part, but attached thereto by a plurality of attaching means indicated at 41. Both of these castings are preferably formed of lightweight metal as single die cast units, thereby facilitating the construction and assembly of the completed device. An end cap 42 is positioned in place over the end of the device and held in place thereon by means of attaching screw 43 extending into a rib 44.

The motor unit is entirely contained within the upper housing portion 40, thereby providing for the assembly of this device as a unit, and also for the removal of the upper casing part from the remainder of the device, for repair and the like, thereby avoiding the necessity of dismantling the assembled motor unit when access is desired to other parts of the mechanism. The motor drive and its control mechanism as well as other features of the invention not claimed herein, are fully disclosed in the applications of which this is a division and are not described in detail herein. The motor provides for driving a planetary head 125 in which the planetary shaft 126 is journaled. Upon the upper end of shaft 126 is mounted pinion 127 which engages a stationary ring gear 128 formed integrally with the lower casing structure 31. This structure provides for the rotation of shaft 126 in a planetary manner upon rotation of the planetary head. Annular flange 129 fitting over the lower end of the planetary head serves to present a finished decorative appearance and to prevent downward seepage of lubricant and the like. Access to the attaching screws 41 for attaching the upper casing and the lower casing together is afforded by slipping off flange 129, followed by the removal of the pin for holding the planetary head in place, to effect the dropping of the planetary head from its drive shaft.

The beater element 35 is attached to the lower end of the planetary shaft 126 by means of a bayonet type attachment, spring means 130 providing for retaining the beater in assembled position. To provide for the close approach of its beater to all parts of the bowl throughout its extent of movement, and to secure free and unobstructed removal thereof from the bowl, the radius of curvature of the edge of the beater is made substantially equal to that of the wall of the bowl, with only sufficient difference to provide the clearance necessary in operation. This provides for the close approach and substantially uniform spacing of the beater with respect to the bowl in all positions of operation. The center of curvature of the bowl is the same as that of the edge of the beater in its forwardmost position in the bowl, such center being located slightly above the pivot axis 32. As a result, when the device is tilted to inoperative position, the beater moves out of the bowl to such extent that removal of the bowl is possible without objectionable interference from the beater. If the device stops with the beater in the position shown in dotted lines in Fig. 1, it moves upwardly along the side wall of the bowl with the spacing gradually increasing as the beater is withdrawn until a final clearance and inoperative position is reached in which the lowermost part of the beater stands above the rim of the bowl, so that the bowl may be quickly and readily moved into and out of its operative position. If the beater stops in the full line position, the lowermost portion of the beater is sufficiently close to the top of the bowl and is so spaced inwardly from the rim that the bowl may likewise be readily removed and replaced; and in any other position of the beater, the conditions are intermediate those described so that no objectionable interference occurs at any position.

In the operation of the device the latching lever 106 is thrown to the unlocking position and the power drive unit is tilted to raise the planetary shaft 126 to convenient position for attaching beater element 35. The bowl is then placed over fastening screw 20 as previously described and locked in position thereon, the beater being raised sufficiently above the level of the bowl in inoperative withdrawn position so that adequate clearance is provided and the beater does not materially impede the rapid and easy positioning of the bowl. The motor may then be started or the beater may first be lowered into the bowl, and locked in place. The beater then operates with its highly effective planetary action throughout the entire contents of the bowl. The rotation of the beater is such that by reaction on the work material in the bowl there is a tendency to tighten the bowl upon the fastening screw 20 so that even if not secured firmly at the time of its positioning on the base, it will in operation be caused to more securely attach itself. At the end of the operation, the power drive unit may be unlatched and tilted to withdrawn position regardless of the location of the beater element, and the bowl then removed by rotation to unscrew the same from the threaded member 20. The threaded member 20 drops by gravity so that when released from the bowl, the bowl is only slightly raised above the plane supporting surface formed by bosses 14, and no objectionable tilting thereof occurs.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a food handling apparatus of the character described, the combination of a base, a bowl, means on said base for receiving said bowl in predetermined positioning thereon, and means on said base for releasably locking said bowl in said predetermined positioning upon limited rotational movement of the bowl and with no more than slight vertical movement of the bowl.

2. In a food handling apparatus of the character described, the combination of a base, a bowl having a seat projecting downwardly from the bottom thereof, means on said base for receiving said bowl seat in predetermined positioning thereon, and cooperating threaded means on said base and said bowl for releasably locking the bowl in said predetermined positioning on the base upon limited rotational movement of the bowl.

3. In a food handling apparatus of the character described, the combination of a base, a bowl having a seat projecting downwardly from the bottom thereof, a plane surface provided on said base and adapted to receive the seat of said bowl, and cooperating means located at the bottom of said bowl and on said base providing for drawing said seat downwardly upon said surface of the base in response to rotation of the bowl and with no more than slight vertical movement of the bowl.

4. In a food handling apparatus of the character described, the combination of a base, a bowl, means on said base for receiving said bowl in predetermined positioning thereon, a locking member extending through said base in a position to be concealed and protected by said bowl when mounted on said base, means for mounting said locking member for limited longitudinal movement thereof on said base, and means on said bowl cooperating with said locking member for drawing said locking member upwardly with no more than slight vertical movement of the bowl to effect a locking relation between said bowl and base with the bowl securely supported on the base.

5. In a food handling apparatus of the character described, the combination of a base, a bowl, means on said base for receiving said bowl in predetermined positioning thereon, a threaded member positioned in said base, said bowl having provision for receiving said threaded member, and means providing for mounting said threaded member for longitudinal movement in response to rotation of the bowl as said member is threaded into the bowl to lock the bowl in said predetermined positioning with no more than slight vertical movement of the bowl.

6. In a food handling apparatus of the character described, the combination of a base, a bowl, a plurality of spaced supporting elements provided on said base and forming a seat for receiving said bowl in predetermined positioning on the base, locking means on said base located substantially centrally of said supporting elements, cooperating locking means on said bowl, and means providing for interengagement of said locking means to effect locking the bowl in operative position on said base with no more than limited tilting of the bowl upon interengagement and disengagement thereof and providing for locking and unlocking the bowl with no more than slight vertical movement of the bowl.

DAVID A. MEEKER.
RUSSELL C. GEIGER.